(12) United States Patent
Nathan et al.

(10) Patent No.: US 7,266,604 B1
(45) Date of Patent: Sep. 4, 2007

(54) PROXY NETWORK ADDRESS TRANSLATION

(75) Inventors: Abraham Nathan, Haifa (IL); Vinod V. Valloppillil, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/541,461

(22) Filed: Mar. 31, 2000

(51) Int. Cl.
*G06F 15/173* (2006.01)
*G06F 15/16* (2006.01)
*G06F 15/167* (2006.01)

(52) U.S. Cl. ..................... 709/225; 709/217

(58) Field of Classification Search ................ 709/245, 709/238, 218, 201–202, 217, 225; 713/201
See application file for complete search history.

(56) References Cited

U.S. PATENT DOCUMENTS

| | | | |
|---|---|---|---|
| 5,793,763 A * | 8/1998 | Mayes et al. | 370/389 |
| 5,835,726 A | 11/1998 | Shwed et al. | |
| 6,128,664 A * | 10/2000 | Yanagidate et al. | 709/228 |
| 6,182,226 B1 * | 1/2001 | Reid et al. | 726/15 |
| 6,212,558 B1 | 4/2001 | Antur et al. | |
| 6,243,815 B1 * | 6/2001 | Antur et al. | 713/201 |
| 6,360,265 B1 * | 3/2002 | Falck et al. | 709/227 |
| 6,389,462 B1 * | 5/2002 | Cohen et al. | 709/218 |
| 6,493,349 B1 * | 12/2002 | Casey | 370/409 |
| 6,493,765 B1 * | 12/2002 | Cunningham et al. | 709/245 |
| 6,510,154 B1 * | 1/2003 | Mayes et al. | 370/389 |
| 6,625,149 B1 * | 9/2003 | Brustoloni et al. | 370/389 |
| 6,728,885 B1 * | 4/2004 | Taylor et al. | 726/24 |
| 7,107,612 B1 * | 9/2006 | Xie et al. | 726/13 |
| 7,146,639 B2 * | 12/2006 | Bartal et al. | 726/11 |

OTHER PUBLICATIONS

Rozell et al. Proxy Server's Sturctural Design , pp. 1-19, 1998.*
Eric Hall, Hide & Seek With Gateway & Translators , pp. 1-5, Feb. 15, 1997.*
Eric Hall, FTP offers extensive Netware-Internet connectvity, pp. 1-3, Jul. 21, 1997.*
Eric Hall, Internet Firewall Essentials pp. 1-6, Jan. 1, 1996.*
K, Egevang et al., "The IP Network Address Translator (NAT)," IETF RCE1631, pp. 1-11 (May 1, 1994).
Egevang et al, "The IP Network Address Translator (NAT)", IETF Request for Comments 1631, May 1, 1994, pp. 1-11.
Foreign Search Report dated Feb. 21, 2006, relating to Application No. EP 01 905 222.4.

* cited by examiner

*Primary Examiner*—Larry D. Donaghue

(57) ABSTRACT

Proxy network address translation (PNAT) is disclosed, which combines proxy server capability with network address translation (NAT) capability. At a NAT component, address translation is performed at a packet level of a stream of packets originating from a client and destined for a server. The address translation redirects the packets to a proxy component, and masks the source of the packets. At the proxy component, filtering is performed at a stream level of the stream of packets. The proxy component transmits the packets to the server. A specific installed component is not required at clients for access through the PNAT. The PNAT retains the advantages of a proxy server, while retaining for the component-less nature of access of NAT.

9 Claims, 6 Drawing Sheets

PRIOR ART

PROXY NETWORK ADDRESS TRANSLATION

FIELD OF THE INVENTION

The invention relates generally to accessing networks such as the Internet, and more specifically to providing for security when accessing networks.

BACKGROUND OF THE INVENTION

Allowing networks and individual computers to access other networks such as the Internet can be important. For example, in many corporations, as well as for home users, being able to access web sites on the Internet, as well as being able to receive email from and send email to addresses accessible only through the Internet allows for corporate and home users to become more productive. However, providing such access increases security risks to the networks and individual computers that can access the Internet. Data stored on the networks and individual computers may be compromised by hackers, for example, and the potential for viruses to infect the networks and individual computers substantially increases.

Within the prior art, there are at least two mechanisms for providing access and security to the Internet. A first mechanism is known as proxy servers, which are also referred to as application-level gateways. A proxy server is an application that breaks the connection between sender and receiver. The proxy server closes a straight path between two networks and thus prevents a hacker from obtaining internal addresses and details of a private network. An advantage to proxy servers is that they can work on a data stream basis. This is more convenient to handle because transmitted data may be packetized differently from application-level packets. As a result, the parsing and transformation that the proxy needs to do requires data buffering. Since the proxy terminates the session between the host on the client and the proxy, only the application protocol payload is transferred to the host; information of lower levels are stripped out by the proxy stack. However, the disadvantage to proxies is that clients usually must have an installed component tied to a specific proxy server. Clients that do not have such a component cannot use the proxy, unless, for example, the application running on the client itself has support for the proxy built therein A second mechanism is known as network address translation (NAT). NAT converts the address of each local-area network (LAN) client node into one Internet Protocol (IP) IP address for the Internet and vice versa on a data packet-by-data packet basis. It also serves as a firewall by keeping individual IP addresses hidden from the outside world. The advantage to NAT is that the clients do not have to have a specific component installed in order to work with the NAT—the NAT intercepts their requests for information on the Internet, translates the address so that the requestors' address is hidden, and when data comes back from the Internet bound for one of the requestors, retranslates the address and sends the data back to the appropriate client. However, the disadvantage to NAT is that NAT has difficulty with proprietary or uncommon protocols, where the client's address, for example, may be embedded within a data packet in a manner not known by the NAT. Thus, NAT typically works with protocols with no embedded addresses in the payload where editing is not required, or well know protocols for which NAT editors are available within the art.

Thus, while NAT allows for access by any client, it does not work with all protocols, and does not provide as substantial security nor as rich a feature set as does a proxy server. However, a proxy server requires an installed component at each client desiring access through the proxy server. For these and other reasons, there is a need for the present invention.

SUMMARY OF THE INVENTION

The invention relates to proxy network address translation (PNAT). In one embodiment, a method includes two parts. First, at a network address translation (NAT) component, address translation is performed at a packet level of a stream of packets originating from a client and destined for a server. The address translation redirects the packets to a proxy component, and masks the source of the packets. Second, at the proxy component, filtering and address editing are performed at a stream level of the stream of packets. The proxy component transmits the packets to the server.

Embodiments of the invention provide for advantages not found within the prior art. Embodiments combine the advantages of proxy servers with the advantages of NAT, in a combined PNAT. Like a NAT, the combined PNAT does not require special installed components on the clients for access through the PNAT. However, like a proxy server, the combined PNAT enables data inspection at a stream level, which means that better security and more rich features can still be provided by the PNAT.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
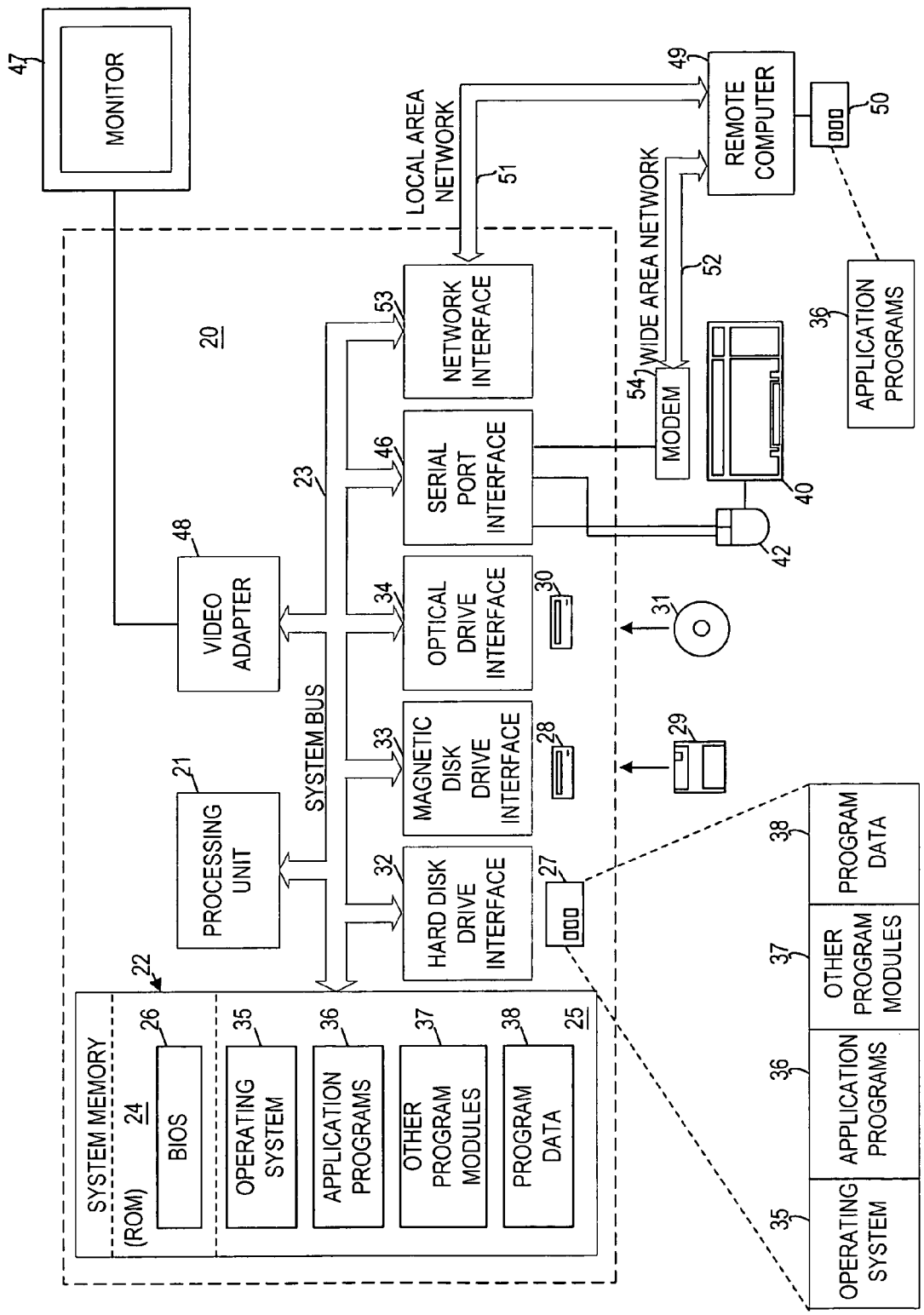
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Data Packet Streams

Figure 2:
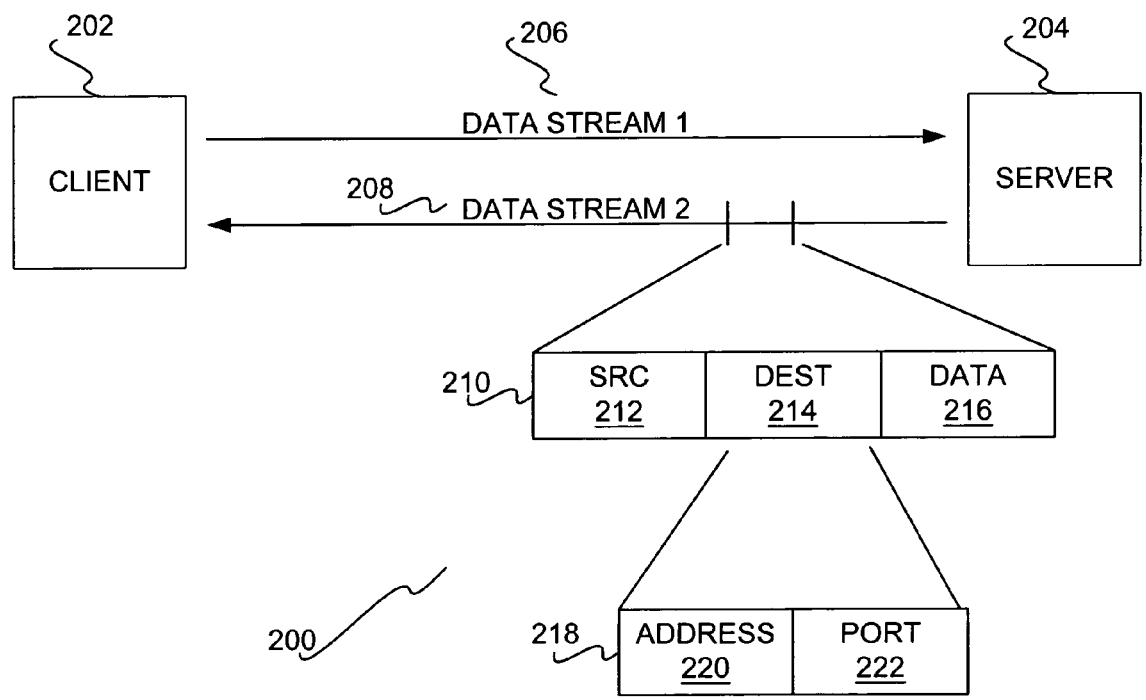
FIG. 2 is a diagram of streams of data packets between a client and a server, in conjunction with which embodiments of the invention can be practiced.

In this section of the detailed description, data packet streams, in conjunction with which embodiments of the invention can be practiced, are described, in conjunction with FIG. 2. The system 200 of FIG. 2 includes a client 202, a server 204, a first data stream 206 sent from the client 202 to the server 204, and a second data stream 208 sent back from the server 204 to the client 202. Each of the client 202 and the server 204 can in one embodiment be a computer, such as has been described in the preceding section of the detailed description. The data streams 206 and 208 can in one embodiment by transmitted between the client 202 and the server 204 through a network, such as the Internet, an intranet, an extranet, a local-area network (LAN), a wide-area network (WAN), or a combination of two or more of such networks.

Each of the streams 206 and 208 is made up of a number of data packets. A stream is generally defined in a non-limited and non-restrictive manner as a contiguous group of data and/or a data transmission that occurs in a continuous flow. A representative data packet 210 is shown in FIG. 2, as part of the second data stream 208. A data packet is generally defined in a non-limited and non-restrictive manner as a unit of information transmitted as a whole from one device to another over a network. Most data communications is based on dividing a transmitted message into packets.

The data packet 210 includes three constituent parts: a source identifier 212, a destination identifier 214, and data 216. The source identifier 212 identifies the source of the packet, such as the client 202 or the server 204. Likewise, the destination identifier 214 identifies the destination of the packet, such as the server 204 or the client 202. The data 216 is the actual substantive data of the packet, and can also be referred to as the "payload" of the packet.

The invention is not limited to the type of identifier used as the identifiers 212 and 214. However, in one embodiment, a representative identifier 218 shown in FIG. 2 includes an address 220 and a port 222. The address 220 uniquely identifies a resource on a network, such as the client 202 or the server 204. In one embodiment, the address 220 is an Internet Protocol (IP) address, which as known in the art uniquely identifies a resource on a Transmission Control Protocol/Internet Protocol (TCP/IP) network, as also known within the art. In such an embodiment, the packets making up the data streams 206 and 208, such as the representative packet 210, are referred to as IP packets. It is noted that in IP packets the layout of the IP information is such that the port number and IP address are not adjacent.

The port 222 identifies a particular process on a computer connected to a network, such that data streams are sent to and from the port. A single process may have multiple sockets (each using a port). In one embodiment, the port 222 is specifically referred to as a port number. A port number is generally defined in a non-limited and non-restrictive manner as a number that enables IP packets to be sent to a particular process on a computer connected to a TCP/IP network such as the Internet. Some port numbers, called "well-known" port numbers, are permanently assigned; for example, e-mail data under the Simple Mail Transport Protocol (SMTP) goes to port number 25.

Network Address Translation (NAT)

Figure 3:
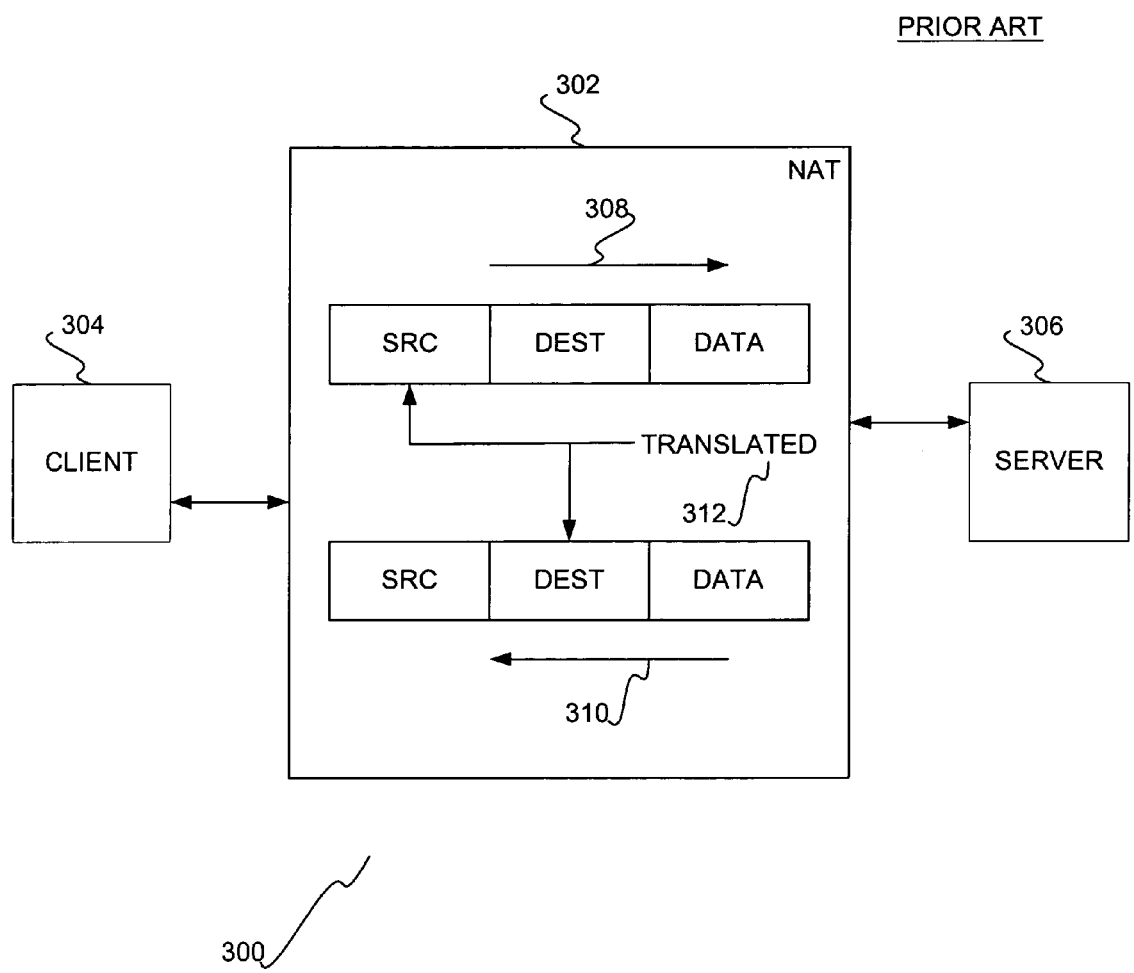
FIG. 3 is a diagram of a system utilizing network address translation (NAT), in accordance with the prior art.

In this section of the detailed description, an overview of network address translation (NAT), as known within the prior art, is provided, in conjunction with FIG. 3. The system 300 of FIG. 3 includes a NAT device 302, a client 304 and a server 306. As shown within the NAT device 302, the NAT device 302 passes both outgoing data packets from the client 304, as represented by the arrow 308, and incoming data packets to the client 304, as represented by the arrow 310. Each of the client 304 and the server 306 can be a computer as has been described in a preceding section of the detailed description.

The NAT device 302 receives packets from and sends packets to the client, and it receives packets from and sends packet to an outside public network, such as the Internet, to which the server 306 is connected (not shown in FIG. 3). In NAT, the end points are the client 304 and the server 306.

For the outgoing data packets, generally the NAT device 302 translates the source identifier, as indicated by 312 in FIG. 3. For example, the source identifier typically includes the address of the client 304, which may be the internal private Internet Protocol (IP) address of the client 304. The NAT device 302 changes this internal private IP address to, for example, the public IP address for the entire local-area network (LAN) of which the client 304 is a part (not shown in FIG. 3). Thus, the server 306, upon receiving the packet, does not know that it specifically came from the client 304, but only from the public IP address of the network of which the client 304 is a part.

Similarly, for the incoming data packets, generally the NAT device 302 translates the destination identifier, as also indicated by 312 in FIG. 3. For example, the destination identifier typically includes the public IP address for the entire LAN of which the client 304 is a part. The NAT device 302 determines that the packet is more specifically meant for the client 304, and changes this public IP address to the internal IP address of the client 304. This process is transparent to both the client 304 and the server 306—that is, the client 304 thinks it is communicating directly with the server 306, and not through the NAT device 302, while the server thinks it is communicating with a particular node represented by the public IP address indicated in packets sent thereto, and not with the client 304 specifically.

It is noted that the NAT device 302 works at a packet level. That is, it inspects packets as they are sent therethrough, and changes them accordingly. Packet-level inspection is disadvantageous in at least one respect because the NAT device 302 is usually unable to glean information from the data stream of which a particular packet is a part. Thus, the NAT device 302 may not be able to provide adequate security where compromising attacks on the device 302 are divided over a number of different packets, for example. It is noted that while it is possible to provide for this security at the packet level, via what is known in the art as stateful inspection, it is complex. As a result, stateful inspection is usually done only for the most common protocols.

Proxy Server

Figure 4:
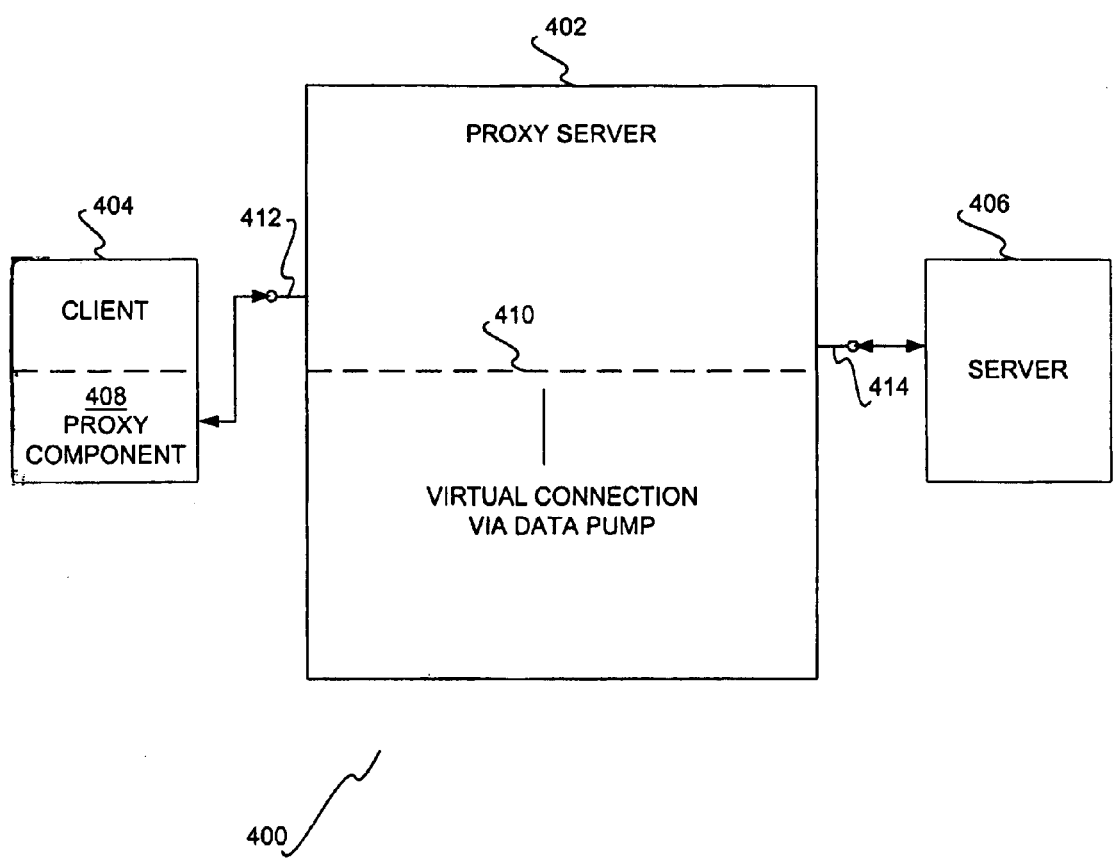
FIG. 4 is a diagram of a system utilizing a proxy server, in accordance with the prior art.

In this section of the detailed description, an overview of proxy server, as known within the prior art, is provided, in conjunction with FIG. 4. The system 400 of FIG. 4 includes a proxy server 402, a client 404 and a server 406. Each of the client 404 and the server 406 can be a computer as has been described in a previous section of the detailed description. The client 404 includes a proxy component 408, which is particularly tied to the proxy server 402. It is noted that this separation between the client application and the proxy component is most obvious for generic proxies, such as Microsoft WSP and SOCKS, as known within the art. For HTTP (CERN) proxies, as also known within the art, the functionality is integrated therein, such that there is no interception of the stream.

When the client 404 desires to send a data stream of packets to the server 406, the proxy component 408 intercepts the stream, and directs it to a first socket 412 of the proxy server 402. A virtual connection as represented by 410 is maintained by the proxy server 402 between the first socket 412 and a second socket 414, the latter from which the data stream is then sent to the server 406. A data pump specifically maintains the virtual connection, as known within the art, such that the actual connection between the client 404 and the server 406 is broken; the proxy maintains the virtual connection by transferring data from one connection to the other (in both directions). Thus, the direct connection between the client 404 and the server 406 is broken by the server 402 via the virtual connection 410.

Similarly, when the server 406 desires to send a data stream back to the client 404, it is received at the second socket 414 of the proxy server 402. The virtual connection 410 between the second socket 414 and the first socket 412 ensures that the data stream is sent to the client 404, specifically from the first socket 412. The data stream is then intercepted by the proxy component 408 of the client 404.

It is noted that the proxy server 402 works at a stream level. That is, the proxy component 408 redirects the stream of data packets to the socket 412, where the stream is broken at the proxy server 402, such that it is only virtually connected via a data pump as represented by 412 in FIG. 4. By working at the stream level, the server 402 generally provides for better security than network address translation (NAT), and also provides for easier extensibility, since security rules and policies can be dictated at the stream level, as opposed to the packet level. It is noted that the process as described herein provides limited security (e.g., address hiding, connection termination, etc.). However, as can be appreciated by those of ordinary skill within the art, application proxies typically do more, using the specific knowledge of the application protocol. As will be described in the next section of the detailed description, embodiments of the invention facilitate integration of extensions with knowledge of specific application-level protocols. However, disadvantageous to the proxy server 402 is that it requires the presence of the proxy component 408 on the client 404.

Proxy Network Address Translation (PNAT)

In this section of the detailed description, proxy network address translation (PNAT) according to varying embodiments of the invention is described. Specifically, PNAT is described as systems, methods, computer-readable media, etc., of varying scope. PNAT according to embodiments of the invention provides for proxy server-like inspection at a stream level, while not requiring the presence of proxy components at clients, as in a NAT.

Figure 5:
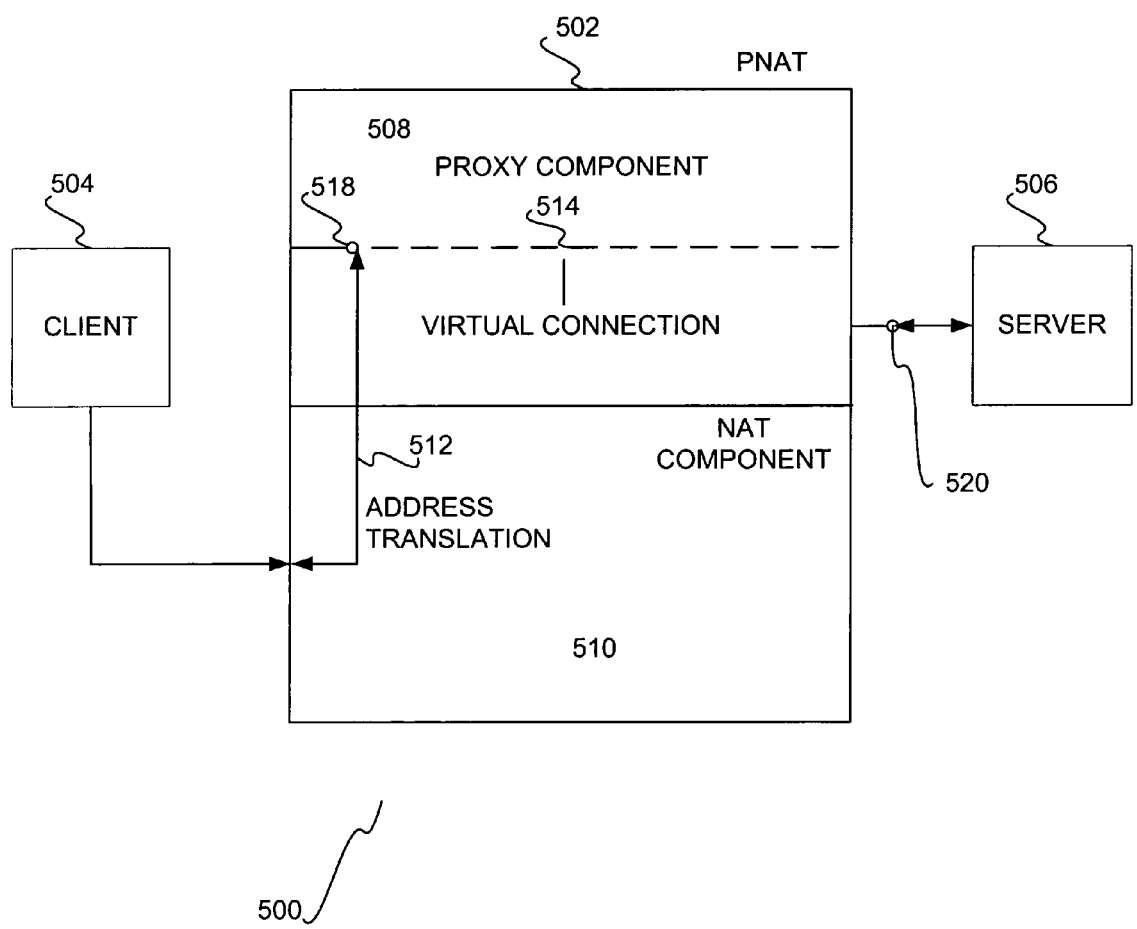
FIG. 5 is a diagram of a system utilizing proxy network address translation (PNAT), according to an embodiment of the invention; and, FIG. 6 is a flowchart of a method according to an embodiment of the invention.

Referring first to FIG. 5, a diagram of a system according to one embodiment of the invention is shown. The system 500 includes a PNAT device 502, a client 504 and a server 506. The PNAT device 502 can in varying embodiments be implemented in hardware, software, or a combination of hardware and software. The device 502 can be a computer, such as described in a previous section of the detailed description, having software designed to implement its functionality. It can also be a stand-alone Internet appliance, for example. Each of the client 504 and the server 506 can also be a computer as described in the previous section of the detailed description, although the invention is not so limited. It is noted that a client proxy component, as described in the preceding section of the detailed description, is not required at the client 504.

The client 504 and the server 506 communicate with one another via a first stream of packets from the client 504 to the server 506, and a second stream of packets from the server 506 to the client 504. In one embodiment, the PNAT device 502 serves as the default gateway for the client 504. The default gateway makes packets sent to the server 506 go through the device 502, even though the destination is 506.

At a NAT component 510 of the PNAT device 502, address translation is performed at a packet level, as shown as 512 in FIG. 5. Address translation is provided such that the packets are translated so that they are directed to a first socket 518—that is, the destination identifier is set as the first socket 518. The original destination address of the packets is persisted in one embodiment. The NAT component 510 thus provides comparable functionality as a NAT device does, as has been described.

At a proxy component 508 of the PNAT device 502, the path between the client 504 and the server 506 is broken. Thus, the proxy component 508 establishes a virtual connection 514 between the first socket 518 and a second socket 520, via a data pump in one embodiment, so that the client 504 is able to communicate with the server 506. At this time, the proxy component performs filtering at a stream level. Data packets of the first stream then are sent from the socket 520 to the server 506, via their original destination address that may have been persisted. The proxy component 508 thus provides comparable functionality as a proxy server does, as has been described. It is noted that PNAT is used for both TCP and UDP, as these protocols are known within the art. For UDP, in one embodiment, data packetizing is preserved, but this is not the case for TCP.

As can be appreciated by those of ordinary skill within the art, filtering can include, but is not limited to, monitoring of content (e.g., passive logging), content restriction (e.g., censorship), transformation (e.g., compression), as well as any other modification, and also redirecting traffic to a different destination (e.g., an HTTP client may request a URL from a web server, and the filter serves this object from the local cache without actually connecting to the content server).

Similarly, for the second stream returning from the server 506 to the client 504, data packets are received by the proxy component 508 of the PNAT device 502 at the second socket 520. (It is noted that the phrase "second stream" is used conceptually only, that in actuality, the connection between the server 506 and the client 504 is bi-directional in nature, allowing for data transmission in both directions; as described herein, the phrase "first stream" is used for data transmission in one direction, and the phrase "second stream" is used for data transmission in the opposite direction.) A virtual connection 514 between the second socket 520 and the first socket 518 breaks the direct path between the server 506 and the client 504, and the proxy component 508 filters the data stream at a stream level. The data packets are then sent from the first socket 518, during which routing they are translated at a packet level by the NAT component 510 of the PNAT device 502, so that the identifier of the client 504, such as the private IP address of the client 504, is re-inserted into the packets, taking the place, for example, of the public IP address that the private IP address was previously translated to, and the source is set to be the server 506's address and not the first socket 518's address. The data packets then are received by the client 504 from the NAT component 510.

It is noted that for many application protocols, communication traffic includes multiple bi-directional streams, where one stream is used to exchange addresses of another stream. Example protocols in this regard include File Transfer Protocol (FTP), as well as most media streaming protocols. These protocols require specific editing for traversing NAT, as can be appreciated by those of ordinary skill within the art.

It is also noted that each of the proxy component 508 and the NAT component 510 can in varying embodiments be software, hardware, or a combination of software and hardware. For example, where the PNAT device 502 is a computer, each of the components 508 and 510 can be separate parts of the same computer program, or different computer programs altogether. In such embodiments, each of the components 508 and 510 can be executed by a processor of the computer from a computer-readable medium thereof. Furthermore, in one embodiment, each of the components can correspond to a means for performing the functionality previously described in conjunction with the component.

Embodiments of the invention provide for PNAT, where both address translation is performed at a packet level, and filtering is performed at a stream level, while not requiring a special component to be present at clients. In one embodiment, the packet-level address translation is performed by a NAT component of a PNAT device, comparable to a NAT device as has been described, while the stream-level filtering is performed by a proxy component of the PNAT device, comparable to a proxy server as has been described. There are two different sessions for communication between the client and the server: a first session between the PNAT device and the client, and a second session between the PNAT device and the server.

In one embodiment, the PNAT device has two sockets: a first "internal" socket (e.g., socket 518) for communication between the NAT component of the device and the proxy component of the device; and, a second "public-side" socket (e.g., socket 520) for communication between the device and the server. The first socket is an internal socket in that it is for communications between the two components of the PNAT device, the proxy component and the NAT component. The second socket is a public-side socket in that it communicates with the server, which is part of a public network such as the Internet in one embodiment.

Thus, embodiments of the invention combine advantageous aspects of NAT with advantageous aspects of proxies. Like a NAT, the PNAT does not require a special component to be installed at clients, due to its NAT component. However, like a proxy, the PNAT allows for filtering at the stream level, which is usually more feature-rich than translation at the packet level can accomplish, due to its proxy component. It is noted that usually NAT is implemented via a low-level device driver, while proxy is implemented as a user-mode application, as it has a much richer environment when implementing high-end feature, which is especially the case if a firewall is designed as a platform where the protocol provider can provide the protocol editor. Furthermore, with respect to packet inspection as compared to stream inspection, the latter lends itself better to cascading multiple features on the same stream as compared to the former.

Figure 6:
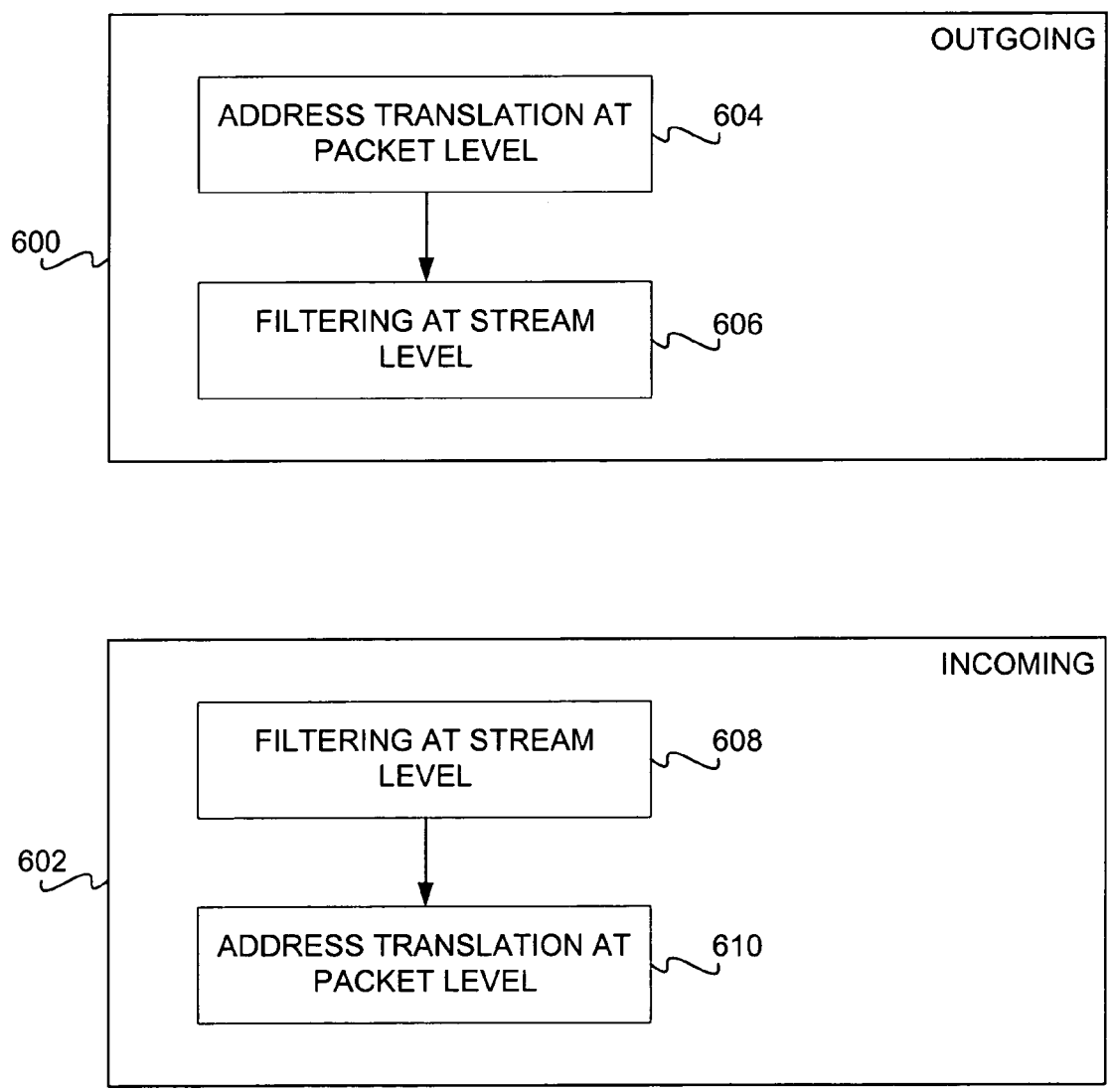

Referring next to FIG. 6, a flowchart of a method according to an embodiment of the invention is shown. The method can be computer-implemented. The computer-implemented method can be realized at least in part as one or more programs running on a computer—that is, as a program executed from a computer-readable medium such as a memory by a processor of a computer, such as the computer shown in and described in conjunction with FIG. 1. The programs are desirably storable on a machine-readable medium such as a floppy disk or a CD-ROM, for distribution and installation and execution on another computer. The method can be implemented in conjunction with the system of FIG. 5 described in the previous section of the detailed description, although those of ordinary skill within the art can appreciate that the invention itself is not so limited.

The method includes two parts: a first part 600 that applies to outgoing data streams of packets from a client to a server, such as a first data stream, and a second part 602 that applies to incoming data streams of packets to the client from the server, such as a second data stream. The first part 600 includes 604 and 606. In 604, address translation is performed by a NAT component at a packet level, on the first stream of packets originating from the client and destined for the server. The address translation redirects the packets to a proxy component, and masks the source of the packets. In 606, filtering is performed by the proxy component at a stream level on the first stream of packets, where the proxy component transmits the packets to the server. It is noted that 600 and 602 are not linked, as may be inferred from FIG. 6 that is, 600 is performed for outgoing traffic, and 602 is performed for incoming traffic, separate from 600.

In one embodiment, the NAT component is specified as the gateway for the client. The first stream of packets are originally directed by the client to the NAT component; the NAT component's address translation redirects the packets to a first socket, at the proxy component. Furthermore, the proxy component transmits the packets from a second socket thereof.

The second part 602 includes 608 and 610. In 608, filtering is performed by the proxy component at a stream level, on the second stream of packets originating from the server, and ultimately destined for the client—although ostensibly destined for the NAT component (inasmuch as the NAT component previously masked the source of the first stream of packets from the client to the server, the packets from the server to the client of the second stream are earmarked by the server as for the destination of the public address by which the NAT component had masked the source of the packets from the client to the server). The proxy component transmits the packets of the second stream to the NAT component. In 610, address translation is performed by the NAT component at the packet level on the second stream. The address translation redirects the packets back to the client.

Thus, the second stream of packets are originally received by the proxy component at the second socket. The second stream of packets are then sent from the first socket by the proxy component to the NAT component. The second stream of packets finally are sent back to the client by the NAT component.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A system for securing data communication between an internet computer network and an external computer network, comprising:
    a client located in the internal computer network;
    a server located in the external computer network and in communication with the client; and
    a proxy network address translation device comprising:
        components for (1) performing, at a packet level, a network address translation upon a stream of packets originating from the client and (2) filtering, at a stream level, the stream of packets and transmitting the packets to the server, wherein the filtering is transparent to the client, and wherein the network address translation component redirects the stream of packets to the filtering component; and
        a communications socket internal to the proxy network address translation device and communicatively connected to the components for (1) performing the network address translation and (2) filtering.

2. The system of claim 1, wherein the components of the proxy network address translation device comprise:
    a first component for filtering said stream of packets, and also for filtering, at a stream level and transparent to the client, a second stream of packets originating from the server; and
    a second component for performing said network address translation, and also for performing, at a packet level, a reverse network address translation with respect to the packets in the second stream and transmitting the packets in the second stream to the client.

3. A device comprising:
    a proxy network address translation device comprising:
        a component for performing, at a packet level, a network address translation with respect to a stream of packets originating from a client in an internal network, wherein the client is communicating the stream of packets to a server located in an external network, and wherein the network address translation component redirects the stream of packets to a component for filtering;
        the component for filtering, at a stream level, the stream of packets, wherein the filtering is transparent to the client;
        a communication socket internal to the proxy network address translation device and communicatively connected to:
            the component for performing the network address translation; and
            the component for filtering; and
        a component for transmitting the packets to the server after the packets are filtered.

4. The proxy network address translation device of claim 3, further comprising:
    a component for filtering, at a stream level and transparently to the client, a second stream of packets originating from the server;
    a component for performing, at a packet level, a reverse network address translation upon the packet in the second stream; and
    a component for transmitting the packet in the second stream to the client.

5. The proxy network address translation device of claim 3, wherein filtering the stream of packets comprises transforming the stream.

6. The proxy network address translation device of claim 3, wherein filtering the stream of packets comprises compressing the stream.

7. The proxy network address translation device of claim 3, wherein filtering comprises content monitoring, content restriction, stream transformation, traffic redirection and combinations thereof.

8. A computer-implemented method for communication between a first network and a second network comprising:
    intercepting, at a first external socket of a proxy network address translation device, a stream of packets;
    performing, at a first internal component of the proxy network address translation device, a network address translation upon the stream of packets, the network address translation occurring at a packet level;
    transmitting, from the first internal component of the proxy network address translation device to a second internal component of the proxy network address translation device using a communication socket internal to the proxy network address translation device, the translated stream of packets;
    filtering, at the second internal component of the proxy network address translation device, the translated stream of packets, the filtering occurring at a stream level; and
    transmitting, from the second external socket of the proxy network address translation device, the translated and filtered stream of packets.

9. The method of claim 8, wherein transmitting from the first internal component of the proxy network address translation device to the second internal component of the proxy network address translation device comprises transmitting the translated stream of packets through an internal socket of the proxy network address translation service.

* * * * *